Oct. 8, 1968  TSUKASA SANO  3,405,259

SPEED ORDERING DEVICES UTILIZING COMPARATOR AND INTEGRATOR MEANS

Filed Nov. 27, 1964  2 Sheets-Sheet 1

INVENTOR
Tsukasa Sano

BY Paul M. Craig, Jr.

ATTORNEY

INVENTOR
Tsukasa Sano
BY Paul M. Craig, Jr.
ATTORNEY

United States Patent Office 3,405,259
Patented Oct. 8, 1968

3,405,259
SPEED ORDERING DEVICES UTILIZING COMPARATOR AND INTEGRATOR MEANS
Tsukasa Sano, Hitachi-shi, Japan, assignor to Hitachi, Ltd., Tokyo, Japan, a corporation of Japan
Filed Nov. 27, 1964, Ser. No. 414,059
Claims priority, application Japan, Nov. 27, 1963, 38/63,280
10 Claims. (Cl. 235—183)

ABSTRACT OF THE DISCLOSURE

A speed ordering device for electric motors used in various machines and equipments, comprising a comparator and an integrator delivering a linearly varying output speed ordering signal in response to a stepped speed setting input signal. The rate of decrease of the linearly varying speed ordering signal is made different from the rate of increase of the speed ordering signal by changing the integration constant of the integrator or by connecting or disconnecting a feedback circuit to the comparator.

---

The present invention relates to an improvement in speed ordering devices of the type provided with a comparator and an integrator, and more particularly to speed ordering devices for controlling the speed of electric motors to effect rapid acceleration and deceleration of reversible rolling mills, high-speed elevators, machine tools, etc.

An object of the present invention is to provide a speed ordering device of the type described by which the rate of acceleration of an associated machine can be set as desired independently of the rate of deceleration.

A further object of the present invention is to provide a speed ordering device which makes it possible to set an increased speed and a decreased speed as desired depending upon the magnitue of load on an associated machine and to effect the desired acceleration and deceleration in a shortest possible time without causing an excessive current to flow through the electric motor.

Another object of the present invention is to provide a speed ordering device which is inexpensive and stable in its operation and is quite suitable for attaining the above-described objects.

As is well known, rapid acceleration and deceleration are requested in equipment such as reversible rolling mills, machine tools designed for making reciprocating movement and high-speed elevators. Generally, the Ward-Leonard system is employed for the control of electric motors in the above-described equipment because the rapid acceleration and deceleration must be effected with high precision. In order to effect the rapid acceleration and deceleration with the use of the Ward-Leonard system, the electric motor may be so controlled that a maximum current is, supplied to the motor while the field strength thereof is maintained at a maximum, but in order to attain this manner of control, it is necessary to increase or decrease the generator voltage substantially linearly. As is commonly known, the generator voltage increases and decreases substantially proportionally with relation to the field strength. Therefore, a field current making a linear increase and decrease may be used as a speed order to effect a linear increase and decrease of the generator voltage.

Hitherto, a speed ordering device has been proposed which is arranged to generate a speed ordering signal of trapezoidal shape formed of a straight line having a pre-established definite rate of variation. The proposed device is constituted of a comparator for generating an output signal having a definite value and having a polarity corresponding to the polarity of an input signal and an integrator for integrating the definite output of the comparator for thereby generating a speed ordering signal having a definite rate of variation. A drawback involved in the prior speed ordering device as described above is that the rate of acceleration is almost equal to the rate of deceleration since the rate of variation of the straight line determining the acceleration and deceleration is solely determined by the integration constant of the integrator. In equipment such as reversible rolling mills and machine tools designed for reciprocating movement, the load at increased speed is generally greater than the load at reduced speed. This is because work on a workpiece is made at an increased speed and the speed is reduced after the work has been done. Therefore, if it is tried to obtain the increased speed at a greater load and the reduced speed at a smaller load at an equal rate of speed variation, a current more than required will be supplied during acceleration whereas a sufficient deceleration current will not be supplied to the electric motor during deceleration with the result that a time longer than is required is necessary to attain the deceleration.

With the above-described drawback of the prior device in view, the present invention provides an improved speed ordering device which is so arranged that acceleration and deceleration can be set separately and independently from each other. According to the device of the present invention, desired variation in the acceleration and deceleration can fully automatically be effected and acceleration and deceleration can be obtained in a short time while a maximum current is continuously supplied to the electric motor.

According to the present invention, there is provided a speed ordering device comprising a comparator operative to compare a stepwise-varying speed setting signal with a linearly varying speed ordering signal for thereby generating an output signal having a predetermined value and having a polarity corresponding to a polarity of the difference between these signals, an integrator operative to integrate the output signal from said comparator for generating the linearly varying speed ordering signal, and means operative to vary the value of the comparator output signal supplied to said integrator depending upon a rise and a fall of the speed setting signal for thereby regulating the rate of variation of the speed ordering signal.

According to the present invention, there is also provided a speed ordering device comprising a comparator operative to compare a stepwise varying speed setting signal with a linearly varying speed ordering signal for thereby generating an output signal having a predetermined value and having a polarity corresponding to a polarity of the difference between these signals, an integrator operative to integrate the output signal from said comparator for generating the linearly varying speed ordering signal, and means operative to vary the integration constant of said integrator depending upon the polarity of the comparator output signal.

According to the present invention, there is further provided a speed ordering device comprising a comparator operative to compare a stepwise varying speed setting signal with a linearly varying speed ordering signal for thereby generating an output signal having a predetermined value and having a polarity corresponding to a polarity of the difference between these signals, an integrator operative to integrate the output signal from said comparator for generating the linearly varying speed ordering signal, and means operative to limit the output signal from said comparator depending upon its polarity.

There are other objects and particularities of the present invention which will become obvious from the following description with reference to the accompanying drawings, in which.

Figure 1:
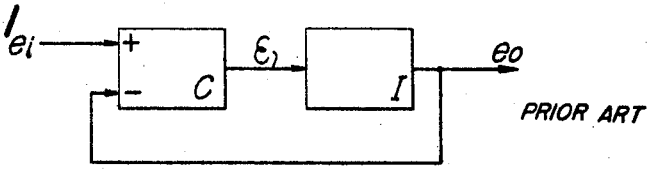
FIG. 1 is a block diagram of a prior art speed ordering device forming the basis of the device according to the present invention.
Figure 3:
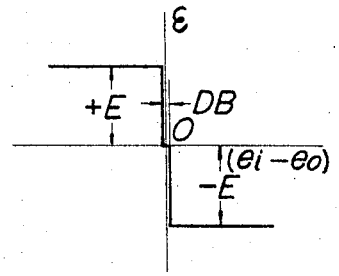
FIG. 3 is a graphic representation of the comparator characteristics in the device of FIG. 1.

The invention will first be described with reference to a conventional speed ordering device according to the prior art as shown in FIG. 1. In the device of FIG. 1, reference character C designates a comparator which generates a definite output of a polarity corresponding to the plurality of an input or a speed setting signal thereinto, and I designates an integrator which integrates the definite output signal from the comparator C to generate a speed ordering signal making a linear increase or decrease. In FIG. 1, the speed setting signal supplied to the comparator C is indicated by reference character $e_i$, the definite output signal from the comparator C is indicated by $\epsilon$, and the speed ordering signal forming the output from the integrator I is indicated by $e_o$. The comparator C has the characteristics as shown in FIG. 3 and is arranged to operate with negative feedback of the above-described integrator output $e_o$ as a negative input thereinto.

Figure 2:
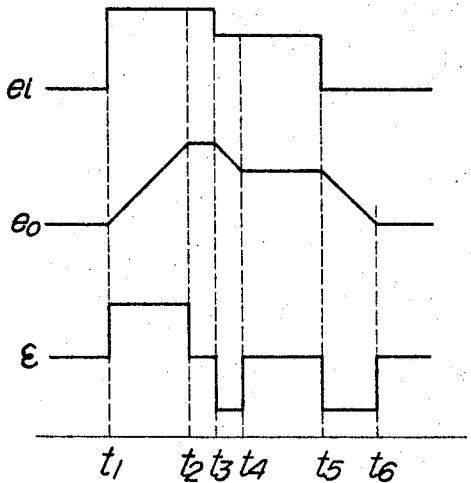
FIG. 2 is a graphic representation of input and output waveforms for the purpose of explaining the operation of the device in FIG. 1.

Suppose now that the speed setting signal $e_i$ with a waveform as shown in FIG. 2 is supplied to the comparator C at a time $t$. At the time $t_1$, the integrator I generates no output and the positive input solely acts on the comparator C. Since the comparator C has the characteristics as shown in FIG. 3 as described above, the comparator C at first generates the signal $\epsilon$ having a value $-E$. As the signal $\epsilon$ at the definite value E is directly applied to the integrator I, the output $e_o$ of the integrator I starts to make a linear increase. Even after generation of the output $e_o$, its value is still smaller than the value of the signal $e_i$ and the comparator C continues to generate the signal $\epsilon$ at the value $-E$. When a time $t_2$ is reached, $e_i$ almost equals $e_o$ and the output $\epsilon$ of the comparator C becomes zero quickly. For the stable operation of the comparator C, the comparator C may preferably have the characteristics which include a suitable inactive zone DB as shown in FIG. 3. When the signal $e_o$ equals the signal $e_i$ and the input signal $\epsilon$ to the integrator I becomes zero, the relation $e_o=e_i=E$ is maintained by the integrator I. Then, suppose the speed setting signal $e_i$ makes a decrease at a time $t_3$. Now, the input into the comparator C is negative and the output $\epsilon$ of the comparator C is inverted in its polarity to have a value $+E$. The integrator I therefore integrates in a manner to release the charge held therein so that the output $e_o$ thereof makes a linear decrease. Then, the signal $\epsilon$ becomes zero again at a time $t_4$ at which the output $e_o$ equals the input signal $e_i$ and the new value of $\epsilon$ is maintained. Similar actions are repeated at regions between times $t_4$ and $t_5$ and times $t_5$ and $t_6$. In other words, when the speed setting signal $e_i$ as shown in FIG. 2 is admitted into the comparator C, the speed ordering signal $e_o$ being the output of the integrator I takes the linearly increasing and decreasing waveform as shown in FIG. 2. It is therefore possible to obtain a speed order having a most desired rate of variation by suitably setting the integration constant of the integrator I. This device, however, provides a same rate of variation for both of acceleration and deceleration.

Figure 4:
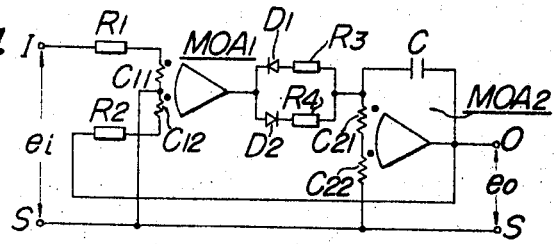
FIG. 4 is a detailed connection diagram of a speed ordering device embodying the present invention.

FIG. 4 shows a connection diagram of an embodiment of the speed ordering device according to the present invention in which an arrangement is made to automatically change over integrating resistors of an integrator depending upon acceleration and deceleration by the utilization of the unidirectional property of diodes. In FIG. 4, reference character MOA1 designates a high-gain magnetic operational amplifier forming a comparator; $C_{11}$ and $C_{12}$, control windings for the amplifier; and $R_1$ and $R_2$, input resistors connected with the respective control windings. Dots on the control windings $C_{11}$ and $C_{12}$ indicate the points of starting of the windings. It will therefore be understood that inputs applied to the control windings $C_{11}$ and $C_{12}$ have polarities opposite to each other. Reference character MOA2 designates a high-gain magnetic operational amplifier forming an integrator which has control windings $C_{21}$ and $C_{22}$ therefor. Reference character C designates an integrating capacitor for the integrator. Reference characters $R_3$ and $R_4$ designate input integrating resistors which are selectively operated by respective diodes $D_1$ and $D_2$ depending upon the polarity of an input signal into the integrator.

As will be apparent from FIG. 4, a speed setting signal $e_i$ is applied to one of the control windings $C_{11}$ of the operational amplifier MOA1, while an output signal $e_o$ of the integrator is applied in negative feedback relation to the other control winding $C_{12}$. As is commonly known, a magnetic operational amplifier has an extremely great amplification factor and a very small input admitted into the amplifier is delivered therefrom as a maximum output signal. It is also known that, by applying suitable feedback to such operational amplifier, the amplifier can be used as an integrator or an adder. The magnetic operational amplifier is most preferred for the control of electric motors since the amplifier of the type is sturdy and inexpensive. The operational amplifier MOA1 shown in FIG. 4 has comparator characteristics as shown in FIG. 3 because no feedback is applied thereto, while the operational amplifier MOA2 acts as an integrator which has an integration constant determined by the values of the input integrating resistors $R_3$ and $R_4$ and by the value of the capacitor C proper because feedback is effected through the capacitor C.

Figure 5:
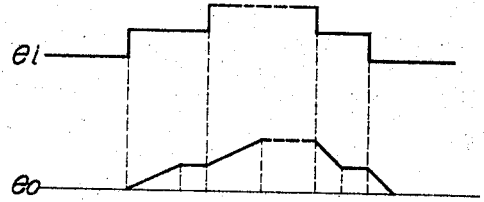
FIG. 5 is a graphic representation of input and output waveforms for the purpose of explaining the operation of the device in FIG. 4.

Now, suppose that a speed setting signal $e_i$ having a stepped waveform as shown in FIG. 5 is admitted into the circuit of FIG. 4. Then, the operational amplifier MOA1 generates a definite signal at a value $-E$. This signal is negative due to polarity inversion by the action of the operational amplifier MOA1. Therefore, this signal causes the diode $D_1$ to conduct and is applied through the integrating resistor $R_3$ to the control windings $C_{21}$ and $C_{22}$ of the operational amplifier MOA2. The definite signal at value E is integrated by the operational amplifier MOA2 in accordance with the integration constant $1/CR_3$ determined by the values of the integrating resistor $R_3$ and the capacitor C. The output $e_o$ of the integrator obtained by integrating the definite input varies linearly but, due to the arrangement in which negative feedback of this integrator output $e_o$ is effected as an input to the comparator, the output of the comparator becomes zero and there is no integrating action by the integrator when the output $e_o$ equals the input $e_i$ as in the case of the device of FIG. 1. The above operation is made each time the speed setting signal $e_i$ makes a rise and thus the speed ordering signal $e_o$ makes a linear rise at a definite rate of variation.

Then, consider a case of deceleration corresponding to a fall in the speed setting signal $e_i$. In this case, since the input acting on the operational amplifier MOA1 is negative, the output of the amplifier MOA1 takes a value E which is positive. Since the output E is now positive, the diode $D_2$ conducts this time and the output is applied through the resistor $R_4$ to the control windings $C_{21}$ and $C_{22}$ of the operational amplifier MOA2. Therefore, the integration constant in the case of deceleration is $1/CR_4$ and it will be evident that, if the value of the resistor $R_4$ is different from the value of the resistor $R_3$, the rate of variation of the speed ordering signal $e_o$ in the case of the deceleration is different from that in the case of acceleration. Suppose now that the value of the resistor $R_4$ is smaller than the value of the resistor $R_3$, then it is possible to make the rate of variation in deceleration greater than that in acceleration and to attain rapid deceleration as shown in FIG. 5. It is to be understood that the above relation between the values of the resistors $R_3$ and $R_4$ may easily be reversed as desired so as to obtain quick acceleration and slow deceleration.

Figure 6:
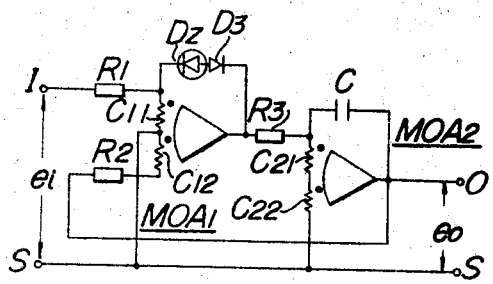
FIG. 6 is a detailed connection diagram of another embodiment according to the present invention.

FIG. 6 shows another embodiment of the speed ordering device according to the present invention. It is known in the art that, in an integrator, the rate of variation of its output also greatly varies depending upon the magnitude of an input thereinto. Or more precisely, a greater input into an integrator results in a correspondingly greater rate of variation of its output since the output of an integrator is an amount of accumulation of input voltage with relation to time. The device shown in FIG. 6 utilizes the above-described property of the integrator and an arrangement is made therein in a manner that a comparator delivers an output which is variable by a suitable value depending upon a positive-going and a negative-going signal input thereinto.

Figure 7:
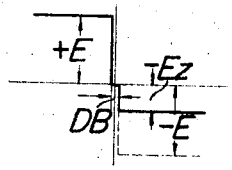
FIG. 7 is a graphic representation of the comparator characteristics in the device shown in FIG. 6.

In FIG. 6, reference character $D_z$ designates a Zener diode; $D_3$, a diode for preventing any flow of inverse current; and $R_3$, an integrating resistor. With regard to other elements, like reference characters shown in FIG. 4 are used to designate like elements. The Zener diode $D_z$ and the diode $D_3$ are connected in series in inverse directions to each other to form a feedback loop for an operational amplifier MOA1. Suppose now that the Zener voltage $E_z$ of the Zener diode $D_z$ is set at a value smaller than the maximum output E of the operational amplifier MOA1. Then, the feedback loop including the Zener diode $D_z$ and the diode $D_3$ operates when the polarity of the output of the operational amplifier MOA1 coincides with the direction in which the diode $D_3$ conducts. When, for example, the Zener diode $D_z$ is connected with the diode $D_3$ in the polarity as shown in FIG. 6, the feedback loop operates at a negative output of the operational amplifier MOA1, that is, when a speed setting signal $e_i$ makes a rise. Therefore, in case of an order for acceleration in which the speed setting signal $e_i$ makes a rise, the feedback action of the Zener diode $D_z$ limits the output of the operational amplifier MOA1 at the value $E_z$ which is considerably lower than the maximum output E of the amplifier. However, in case of an order for deceleration in which the speed setting signal $e_i$ makes a fall, the output of the operational amplifier MOA1 has a positive polarity and is prevented by the diode $D_3$ from flowing back to the amplifier MOA1 with the result that there is no feedback action and the output remains at the value $+E$. In other words, the operational amplifier MOA1 as a comparator shows the characteristics which vary as shown by the solid line in FIG. 7.

Suppose now that a speed setting signal $e_i$ having a waveform as shown in FIG. 5 is admitted into the device of FIG. 6. In case of an order for acceleration in which the speed setting signal $e_i$ makes a rise, the output of the operational amplifier MOA1 is small or has the value $E_z$ and the output $e_o$ of an integrator or operational amplifier MOA2 increases relatively slowly. On the contrary, in case of an order for deceleration in which the speed setting signal $e_i$ makes a fall, the output of the operational amplifier MOA1 is great or has the value E and the output $e_o$ of the operational amplifier MOA2 decreases abruptly. In other words, the output $e_o$ has an overall waveform as shown in FIG. 5. It will be known that the device shown in FIG. 6 operates in a manner entirely similar to the device of FIG. 4.

From the foregoing description, it will be known that in the device of FIG. 4 the integration constant is varied to attain the objects of the present invention, whereas in the device of FIG. 6 the variable input is supplied to the integrator to also attain the same objects. Although it may seem that these devices are greatly different from each other, the variation of the integration constant in the former device may be equivalent to the variation of input by use of the integrating resistors.

Although the present invention has been described with regard to the specific embodiments thereof, it will be understood that the present invention is in no way limited to the devices of FIGS. 4 and 6 and various modifications including a variable integrating capacitor C and integrating resistors replaced by non-linear elements may be made without departing from the spirit of the present invention.

What is claimed is:

1. A speed ordering device comprising comparator means for comparing an input stepwise varying speed setting signal with an input linearly varying speed ordering signal to generate either a positive predetermined comparator output signal or a negative predetermined comparator output signal depending on the polarity of the difference between said stepwise varying speed setting signal and said linearly varying speed ordering signal, integrator means having its input operatively coupled to the output from said comparator means for integrating said comparator output signal to thereby generate said linearly varying speed ordering signal, said linearly varying speed ordering signal generated by said integrator means being fed back to the input of said comparator means, and speed ordering signal variation rate changing means operatively coupled to said comparator means and responsive to the polarity of the comparator output signal for changing the rate of variation of the speed ordering signal for decreasing speeds relative to the rate of variation for increasing speeds.

2. A speed ordering device according to claim 1, in which said comparator and said integrator are magnetic operational amplifiers.

3. A speed ordering device according to claim 1 wherein said speed ordering signal variation rate changing means comprises means for changing the relative magnitudes of said comparator output signals correspondingly with the changes in polarity thereof.

4. A speed ordering device according to claim 3 wherein said means for changing the magnitudes of said comparator output signals comprises a feedback circuit connected in said comparator means and including a Zener diode and a diode connected in reverse polarity, series circuit relationship.

5. A speed ordering device according to claim 4, in which said comparator and said integrator are magnetic operational amplifiers.

6. A speed ordering device according to claim 1 wherein said speed ordering signal variation rate changing means comprises means for changing the integration constant of said integrator means depending on the polarity of said output signal from said comparator means.

7. A speed ordering device according to claim 6 wherein said means for changing the integration constant of said integrator means comprises means for varying an integrating capacitor comprising a pair of said integrator means.

8. A speed ordering device according to claim 6 wherein said means for changing the integration constant of said integrator means comprises non-linear impedance means.

9. A speed ordering device according to claim 6 wherein said means for changing the integration constant of said integrator means comprises two circuit branches connected in parallel, one branch comprising a resistor and a diode connected in series, and the other branch comprising another resistor having a value different from said resistor of said one branch and a diode connected in series therewith and poled in a direction opposite to said diode of said one branch.

10. A speed ordering device according to claim 9, in which said comparator and said integrator are magnetic operational amplifiers.

References Cited

UNITED STATES PATENTS 3,011,714  12/1961  Wheeler _____ 235—178 X
3,176,518  4/1965  Morris et al.

MALCOLM A. MORRISON, *Primary Examiner.*

J. F. RUGGIERO, *Assistant Examiner.*